US005559954A

United States Patent [19]

Sakoda et al.

[11] Patent Number: 5,559,954

[45] Date of Patent: Sep. 24, 1996

[54] METHOD & APPARATUS FOR DISPLAYING PIXELS FROM A MULTI-FORMAT FRAME BUFFER

[75] Inventors: Thomas Y. Sakoda; Bruce Young, both of Tigard, Oreg.

[73] Assignee: Intel Corporation, Santa Clara, Calif.

[21] Appl. No.: 413,922

[22] Filed: Mar. 29, 1995

Related U.S. Application Data

[63] Continuation of Ser. No. 22,719, Feb. 24, 1993, abandoned.

[51] Int. Cl.[6] .................................................. G06F 12/00

[52] U.S. Cl. .......................... 395/164; 395/162; 345/153; 345/133; 345/185

[58] Field of Search .................................... 395/131, 132, 395/154, 157, 162–166, 853–855; 982/56; 358/261.1; 345/22, 24, 114, 115, 116, 119, 120, 133, 135, 153, 154, 185, 199, 201

[56] References Cited

U.S. PATENT DOCUMENTS

| | | | |
|---|---|---|---|
| 4,811,113 | 3/1989 | Ozeki et al. | 358/261.1 |
| 5,241,658 | 8/1993 | Masterson et al. | 395/162 |
| 5,243,447 | 9/1993 | Bodenkamp et al. | 345/133 |
| 5,245,702 | 9/1993 | McIntyre et al. | 395/157 |
| 5,274,753 | 12/1993 | Roskowski et al. | 395/154 |
| 5,402,147 | 3/1995 | Chen et al. | 395/154 |

*Primary Examiner*—Kee M. Tung
*Attorney, Agent, or Firm*—Blakely, Sokoloff, Taylor & Zafman

[57] ABSTRACT

A host processor system is capable of executing a plurality of application programs and generating multi-format pixels for display on a computer display monitor in accordance with the application programs. The host processor system also generates a format map comprising a plurality of format identifiers wherein each format identifier specifies a format type for at least one multi-format pixel. The host processor system transfers multiformat pixel data and the format map to a multi-format frame buffer corresponding to a display monitor. The multi-format frame buffer is coupled to random access memory (RAM) digital to analog converter (DAC). During a blanking period of the display monitor, the format map is transferred from the multi-format frame buffer to a memory in the RAM DAC. The RAM DAC converts the format of each multi-format pixel a format compatible with the display monitor. One of the display compatible formats is selected based on the format identifier specifying the format type for that particular multi-format pixel as described by the format map. The selected multi-format pixel is then converted to an analog signal to control the graphics of the display monitor.

30 Claims, 12 Drawing Sheets

METHOD & APPARATUS FOR DISPLAYING PIXELS FROM A MULTI-FORMAT FRAME BUFFER

This a continuation of application Ser. No. 08/022,719, filed Feb. 24, 1993 now abandoned.

BACKGROUND OF THE INVENTION

1. Field of the Invention

The present invention relates to the field of computer graphics, and more particularly, to a method and apparatus for efficiently displaying pixels stored in a multi-format pixel frame buffer on a computer display monitor.

2. Art Background

Computer systems perform a variety of functions including data acquisition, data processing and display of graphical images. The ability to integrate different external sources to one central processing unit generates a plurality of applications. For example, computers find applications in telecommunication systems where the display monitor provides a graphical display for input messages to an operator, and a man to machine interface provides a means for the operator to generate output messages. Computers also provide a variety of applications in the field of publishing. For example, data bases are generated from external sources, such as imaging scanners or other computer generated data. The data bases from the external sources are input to the computer resulting in a plurality of data formats. In addition, computers have applications for multi-media production which is the integration of several audio and video production units into a single controllable unit. Multi-media projects cover many communication media types, including printed materials, audio programs, television shows, feature films and many others.

As illustrated in the above examples, a computer, configured for data integrated applications, receives data in a plurality of data formats. In order for the operator of the computer to view the data or related information on a display monitor, the data require conversion to a format compatible with the display monitor. For example, a operator may program a computer to display graphical images depicting a spreadsheet on the display monitor, and at the same time, desire to create a display window for a conference call. Although the computer system provides a means to integrate the video signal into the computer environment for the conference call, the video signal comprises a different picture element or pixel format. Furthermore, if the operator desires to integrate several sources each with a different format, the problem is increased.

Generally, in computer graphic systems, a frame buffer is implemented in conjunction with a computer display monitor. The frame buffer contains pixels in a digitized form for display on the corresponding display monitor. The pixel data is arranged in the frame buffer in rows and columns that correspond to rows and columns on the display monitor. To display a graphical image on the display monitor, the pixel data is transferred from the frame buffer and converted to an analog signal by a digital to analog converter (DAC). In a system having multi-format pixel data, each pixel format must be converted to a standard format for the video monitor before conversion to the analog signal. The analog signal is input to the display monitor to generate the graphical image.

Referring to FIG. 1, a prior art method for displaying multi-format pixels on a computer display monitor is illustrated. The multi-format pixel display system comprises a frame buffer for each pixel format type. For the graphics display system illustrated in FIG. 1, frame buffer 12 contains RGB index pixel data, frame buffer 14 contains luminance/chrominance or YUV pixel data, and frame buffer 13 contains RGB value pixel data. In order to display multi-format pixel data types on the display monitor, frame buffers 12, 13 and 14 provide pixel data to DAC 16 in a manner similar to a single frame buffer. In such a multi-frame buffer system, a primary frame buffer, such as frame buffer 12, supplies pixels to DAC 16. In addition to the digital to analog conversion circuitry, DAC 16 contains means for detecting a key color such as a particular color value representing a shade of blue. When DAC 16 detects the key color from the primary frame buffer 12, DAC 16 switches to an alternative pixel data stream such as YUV pixel data from frame buffer 14. Similarly, a second color key is provided to switch the pixel data stream from frame buffer 12 to frame buffer 13. Although such a multi-frame buffer system is operational, the system requires separate frame buffers for each pixel format type.

As an alternative to the multi-frame system, a single frame buffer computer graphics system, containing multi-format pixels, can be implemented. The single multi-format frame buffer comprises, in addition to the pixel data, pixel tags for each pixel. The pixels from the multi-format frame buffer are input to the DAC. The pixel tags identify the pixel format for the corresponding pixels such that each pixel is routed to an appropriate look-up table for conversion to the standard video pixel format. Although the pixel tag multi-format frame buffer requires only a single frame buffer, it requires additional memory in the single frame buffer to store the pixel tags. In addition, standard frame buffers and associated circuitry is designed to accommodate fixed pixel data lengths such as 8, 16 or 24 bits. Consequently, the pixel tag multi-format frame buffer systems require a special sized frame buffer.

SUMMARY OF THE INVENTION

Therefore, it an object of the present invention to integrate multiformat pixel data into an integrated multi-format frame buffer system.

It is a further object of the present invention to store multi-format pixels in a standard frame buffer without the need for pixel tags.

This and other objects of the present invention are realized in an arrangement which includes a host processor system capable of executing a plurality of application programs and generating multi-format pixels for display on a computer display monitor in accordance with the application programs. In addition to generating multi-format pixels for display, the host processor system also generates a format map comprising a plurality of format identifiers wherein each format identifier specifies a format type for at least one multi-format pixel. The host processor system is coupled to a multiformat frame buffer, and transfers multi-format pixel data and the format map to the multi-format frame buffer. The multi-format frame buffer comprises at least one video field of multi-format pixels for display on the computer display monitor.

The multi-format frame buffer is coupled to a random access memory digital to analog converter (RAM DAC). During a blanking period of the display monitor, the format map is transferred from the multi-format frame buffer to a memory in the RAM DAC. Subsequently, during a display period of the display monitor, multi-format pixels are clocked out of the multiformat frame buffer and transferred to the RAM DAC. The RAM DAC converts the format of each multi-format pixel to a RGB color definition compatible with the display monitor. In this way, a plurality of display compatible pixels are generated for each multi-format pixel. One of the display compatible pixels generated is selected based on the format identifier specifying the format type for that particular multi-format pixel. The selected multi-format pixel is then converted to an analog signal to control the graphics of the display monitor.

BRIEF DESCRIPTION OF THE DRAWINGS

The objects features and advantages of the present invention will be apparent from the following detailed description of the preferred embodiment of the invention with references to the drawings in which.

DETAILED DESCRIPTION OF THE INVENTION

A method and apparatus for displaying multi-format pixels on a computer display monitor is disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

In computer graphics systems, pixels are stored as digitized data in frame buffers for display on a monitor. Generally, the pixels are stored as a digitized value representing a red, green and blue (RGB) pixel index. The RGB pixel index value does not directly define a color but requires transformation to a RGB color definition before display on the monitor. In order to convert the RGB pixel index to the RGB color definition, a color map or a color table is required. The RGB pixel index value provides an entry to the color map to generate the corresponding RGB color definition. The RGB pixel index requires less memory to store than the RGB color definition, and consequently, storage of RGB color index pixels in lieu of the RGB color definition in the frame buffer reduces cost and increases overall graphics response time since fewer bits are manipulated per pixel. For example, a RGB color definition may comprise 24 bits wherein 8 bits defines each of the three primary colors. In addition to reducing memory requirements in the frame buffer, the color map provides color correction including gamma correction and color map animation.

Although RGB color index is an efficient format for storing pixels in a computer frame buffer, video systems generally store graphical information in a different color gamut or pixel format. Video systems store color pixels in the luminance/chrominance or YUV format which is derived from broadcast television standards. As described above, computer display monitors generally are compatible to RGB color definition pixel formats. Therefore, for applications requiring YUV pixel format for display on a computer monitor, a mathematical transformation is required to convert YUV pixels to RGB color definition pixels. In addition to the above two color gamut formats, there are applications for addition color gamuts formats. For example, the color gamut Cyan/Magenta/Yellow/Black (CMYK) is used by the printing industry. The CMYK format requires a different mathematical transformation to generate RGB color definition than either the RGB color index or the YUV pixel formats. Beyond the examples provided, additional color gamuts or formats are used in additional applications.

Figure 1:
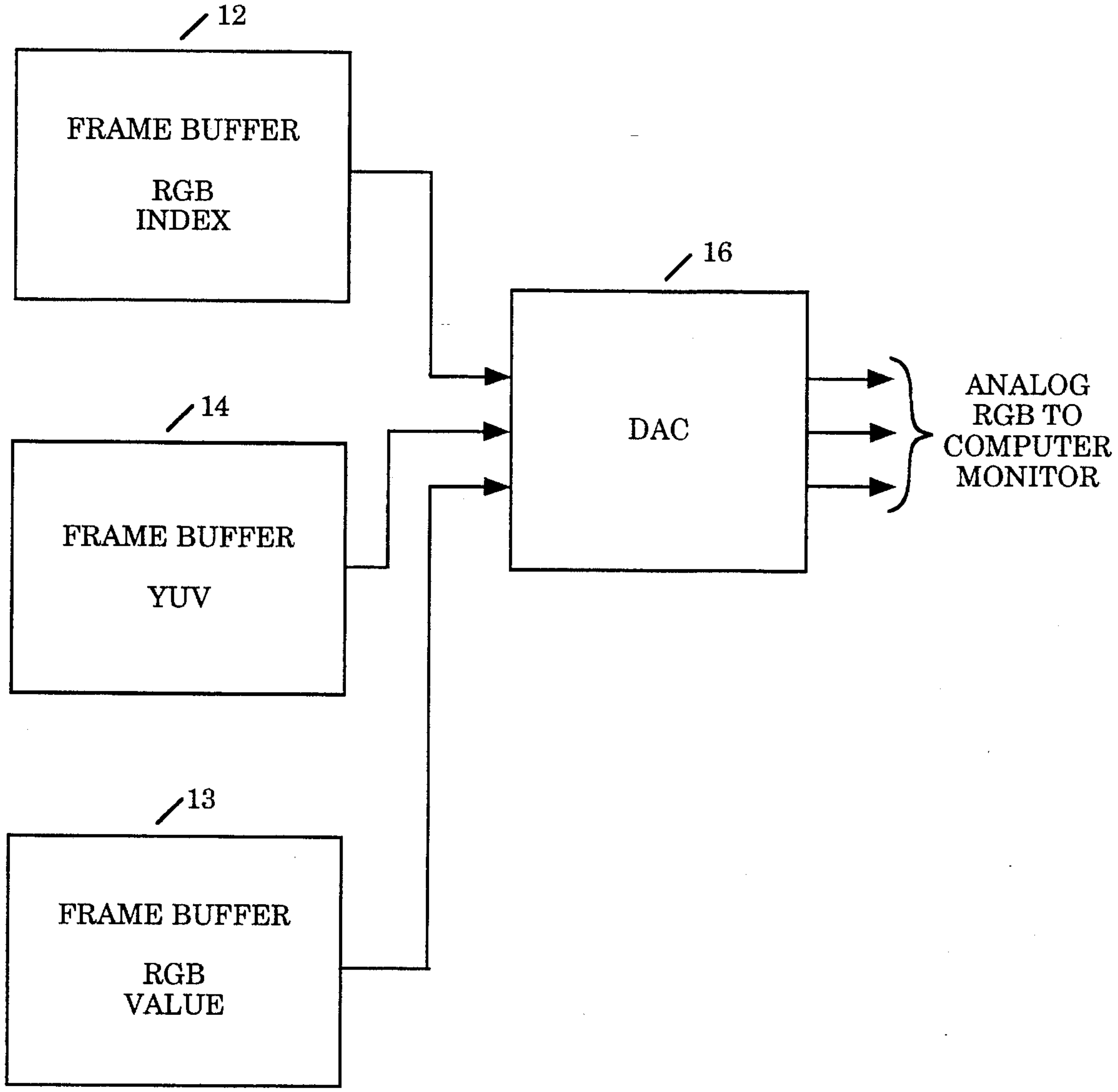
Figure 1 (Prior Art)
FIG. 1 is a block diagram illustrating a multi-frame buffer computer graphics system.
Figure 2:
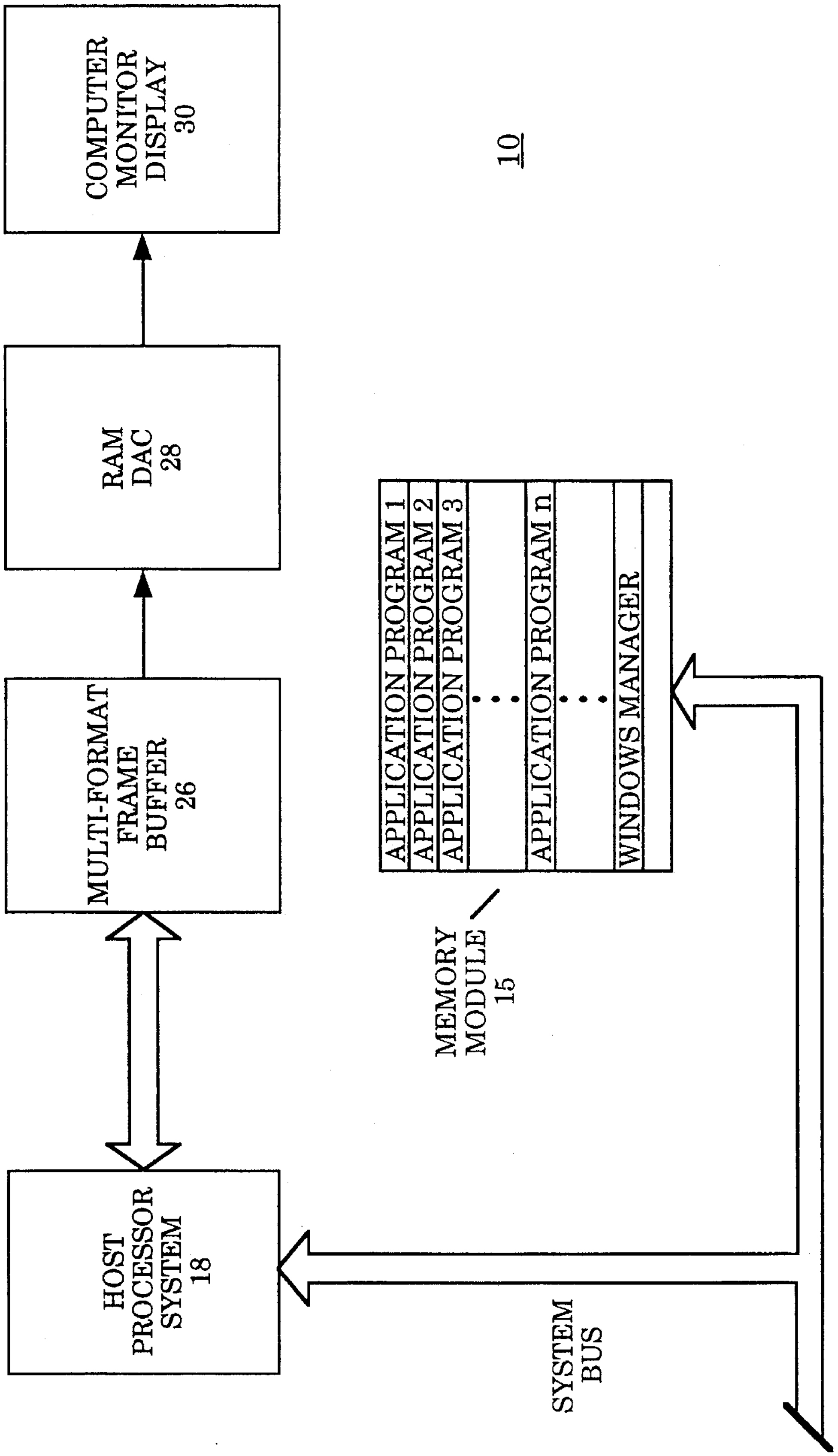
FIG. 2 is a high level block diagram illustrating a computer graphics system configured in accordance with the present invention.

Referring to FIG. 2, a high level block diagram illustrating a computer system 10 for displaying multi-format pixels is illustrated. In computer system 10, a memory module 15 and a host processor system 18 are coupled through a system bus. Memory module 15 stores, in part, a plurality of application programs and a windows manager. Through the system bus, host processor system 18 accesses memory module 15 to execute application programs. Application programs executed in host processing system 18 are generally associated with a particular data format. Because of this, host processor system 18 generates multi-format pixels in accordance with the data format associated with the application program. Host processor system 18 is intended to represent a broad category of processing systems capable of executing graphics functions for a computer display monitor. For example, host processor 18 may comprise a single enhanced central processing unit (CPU) capable of performing graphics functions. Alternatively, host processor system 18 may comprise both a CPU and a co-processor whereby graphics functions are executed on a separate graphics processor or a peripheral display processor by command from the CPU. Graphics processor systems, such as host processor system 18, whether comprising a single CPU or co-processing CPU systems, are well known in the art and will not be described further.

The windows manager is stored in memory module 15 and, when executed by the host processor system 18, allocates the size and location to create windows on a computer display monitor 30. For example, each application program may be designated a separate window, or contain a plurality of windows. Host processor system 18 executes the window manager to allocate size and location of the multi-format pixels generated in accordance with application programs. In order to effectively allocate a size and location for display, the windows manager receives window size requirements from the application programs. The windows manager is intended to represent a broad category of window management and control programs which are well known in the art and will not be described further. In addition to generating multi-format pixels for display, host processor system 18 generates a format map. The format map comprises a plurality of format identifiers wherein each format identifier specifies a format type for at least one multi-format pixel.

Host processor system 18 is coupled to multi-format frame buffer 26. Host processor system 18 transfers multi-format pixels and the format map to multi-format frame buffer 26. Multi-format frame buffer 26 comprises at least one video field of multi-format pixels for display on computer display monitor 30. Multi-format frame buffer is coupled to random access memory digital to analog converter (RAM DAC) 28. During a blanking period of display monitor 30, the format map is transferred from multi-format frame buffer 26 and stored in RAM DAC 28. Subsequently, during a display period of display monitor 30, multi-format pixels are clocked out of multi-format frame buffer 26 and transferred to RAM DAC 28. In the preferred embodiment, RAM DAC 28 converts the format of each multi-format pixel to a RGB definition compatible with display monitor 30. In this way, a plurality of display compatible pixels are generated for each multi-format pixel. One of the display compatible formats is selected based on the format identifier specifying the format type for that particular multi-format pixel. The selected multi-format pixel is then converted to an analog signal to create the desired graphical image on display monitor 30.

In the present invention, for each pixel stored in the multi-format frame buffer 26, there is a corresponding format map. In the preferred embodiment, a horizontal format map is implemented such that a format map is arranged to correspond with a row of pixels for a corresponding multiformat frame buffer. Therefore, the number of horizontal pixels maps required to display an entire field of pixels is equal to the number of horizontal rows on the display monitor. The horizontal format map comprises a plurality of format identifiers specifying the format type for all pixels in one horizontal row of the corresponding multi-format frame buffer and display monitor. For example, if an entire row displayed on a monitor is stored in a multi-format frame buffer with a color map index format, then the corresponding horizontal format map indicates a color index format for each bit in the row. Each pixel of a horizontal row of pixels has a format identifier in its corresponding horizontal format map. The number of bits required to represent the format identifier in the horizontal format map is defined by the following equation:

$$\text{Number of bits in Format Identifier} = \text{Log}_2(\text{\#of format types})$$

rounded up to the next integer. For example, if a multi-format frame buffer contains three different formats, such as luminance/chrominance (YUV), color map index and CMYK, then a 2bit format identifier is required for each pixel. For this example, the format identifier may comprise: a 00 (binary) to identify the YUV pixel format; a 01 (binary) to identify the color map pixel format; and a 10 (binary)to identify the CMYK pixel format.

Figure 3A:
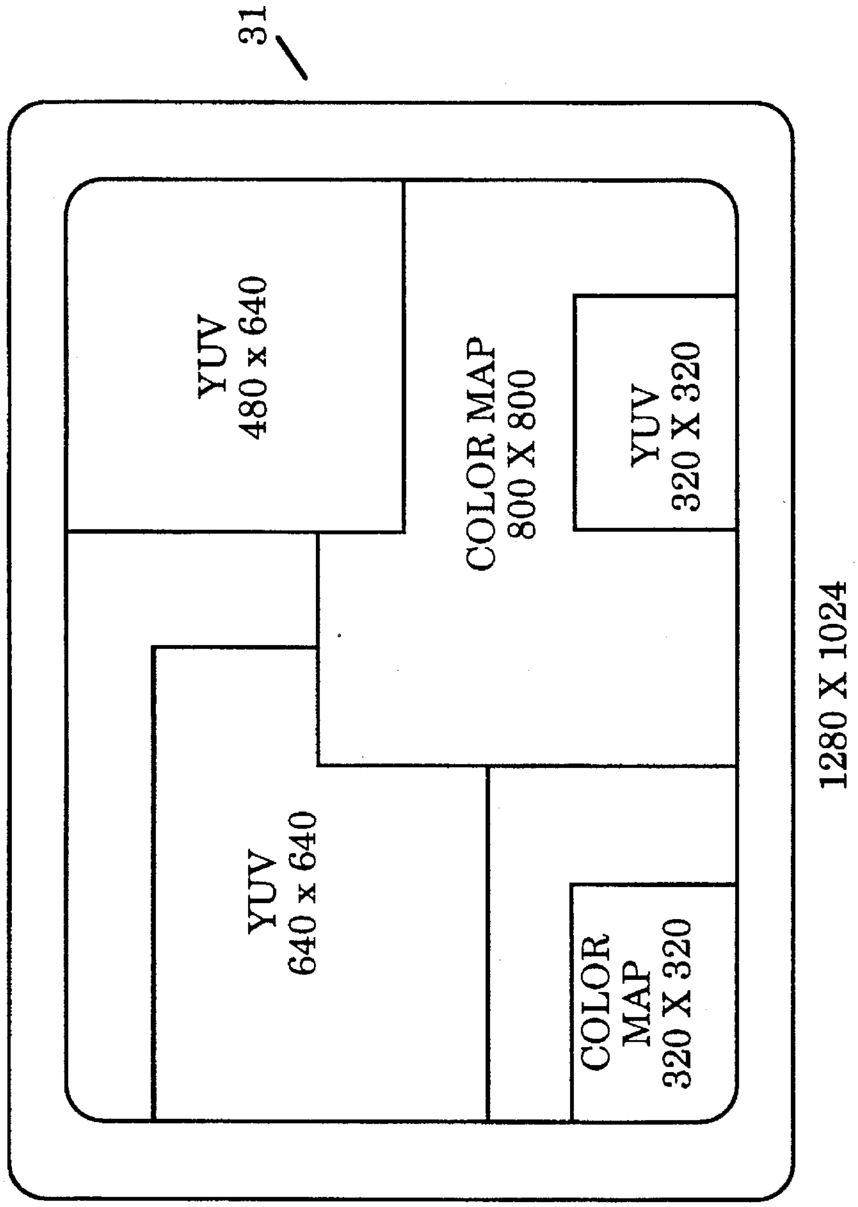
FIG. 3*a* illustrates a multi-format pixel display monitor configured in accordance with the present invention.

Referring to FIG. 3*a*, a multi-format pixel display monitor configured in accordance with the present invention is illustrated. A computer display monitor, such as display monitor 31, comprises 1280×1024 pixel elements. The display monitor 31, illustrated in FIG. 3*a*, displays pixels in both RGB index color map and luminance/chrominance (YUV) pixel formats. The present invention is described in conjunction with a monitor displaying pixels in color map and YUV pixel formats for purposes of explanation only, and one will appreciate that any pixel format could be implemented without deviating from the spirit and scope of the invention. The display monitor 31 comprises two windows of color map pixels, three windows of YUV pixels and a color map pixel background.

Figure 3B:
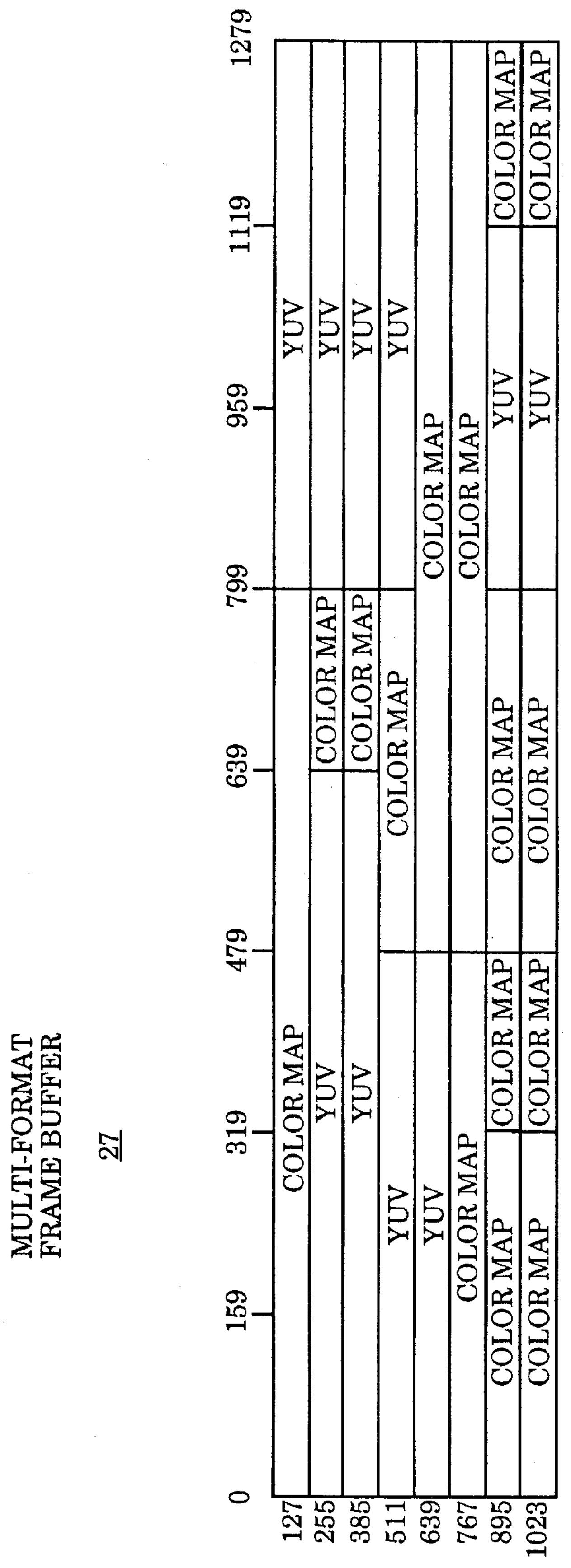
FIG. 3*b* illustrates a multi-format frame buffer configured in accordance with the display monitor illustrated in FIG. 3*a*.

Referring to FIG. 3*b*, a multi-format frame buffer 27 containing multi-format pixels for display on display monitor 31 is illustrated. Multi-format frame buffer 27 contains multi-format pixels for both color map index and YUV format pixels. For purposes of explanation, multi-format frame buffer 27 is divided into sections designating various pixel boundaries. While this invention does not require that the plurality of formats have the same bit resolution per pixel, the implementation is much simpler if each of the formats have identical bit requirements for each pixel. Common values are 8, 16, 24 and 32bits per pixel. In addition, multi-format pixels contained in multi-format frame buffer 27 may also be encoded to reduce the memory requirement for the frame buffer. For example, a common YUV format is compressed to 16 bits per pixel by storing two 8 bit Y components, one 8 bit U component and one 8 bit V component for a pair of pixels. The compression may put an additional burden on the window management software to insure that all transitions between pixel formats fall on legal boundaries. In FIG. 3*b*, the YUV and color map pixel formats contained in multi-format frame buffer 27 correspond with the windows of display monitor 31. For example, in the upper portion of multi-format frame buffer 27, YUV format pixels extend horizontally from columns 799 to 1279, and vertically from rows 0 to 127. This designation in multi-format frame buffer 27 corresponds to the 480×640 pixel YUV window located in the upper right corner of display monitor 31. Preferably, multi-format frame buffer 27 comprises more memory than is required to display a video field on display monitor 31. The utility of the additional memory, or off-screen memory, in multi-format frame buffer 27 is described more fully below.

Figure 3C:
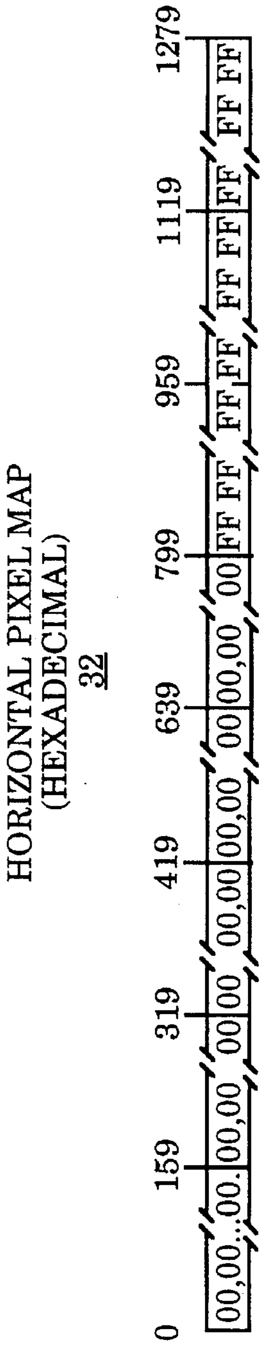
FIG. 3*c* is a horizontal format map configured in accordance with the frame buffer illustrated in FIG. 3*b* and the display monitor illustrated in FIG. 3*a*.
Figure 3D:
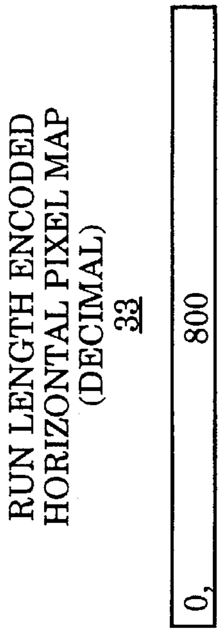
FIG. 3*d* is a run length encoded horizontal format map configured in accordance with the frame buffer illustrated in FIG. 3*b* and the display monitor illustrated in FIG. 3*a*.

Referring to FIG. 3*c*, a horizontal format map configured in accordance with the frame buffer illustrated in FIG. 3*b* and the display monitor illustrated in FIG. 3*a* is shown. Horizontal format map 32 corresponds to the first row of pixels stored in multi-format frame buffer 27. Because multi-format frame buffer 27 contains two pixel format types, (e.g. color map index and YUV), then each format identifier contained in horizontal format map 32 comprises 1 bit. In the example illustrated in FIG. 3*c*, a 0 format identifier signifies a color map pixel format, and a 1 format identifier signifies a YUV pixel format. For illustration purposes, the format identifiers of horizontal format map 32 are shown in hexadecimal. In the first row of display monitor 31, color map index pixels are displayed in the 800 columns starting from the left side. To identify this color map pixel format window, horizontal format map 32 contains 800 format identifiers all comprising a 0 value. In columns 800 through 1280, a YUV pixel format is displayed, and the format identifiers in horizontal format map 32 comprise a 1starting from location 800 through 1279. In a similar manner, additional horizontal format maps are provided to identify all subsequent rows of display monitor 31 and multi-format frame buffer 27.

In the preferred embodiment of the present invention, the format identifiers contained within the horizontal format map are compressed using an algorithm such as run length encoding. Methods of run length encoding include start/stop, start/run and run length only. In start/stop encoding, the format identifier stores the pixel location where a transition from one pixel format to a second pixel format occurs. The utility in implementing start/stop encoding for the present invention depends upon the frequency of transitions between format types. The format map requires enough memory to store all column locations for each transition. For a horizontal format map, the amount of memory required to store a run length encoded map is defined by the following equation:

$$n(\text{bits})=(\text{Number of bits in Format Identifier})*\log_2(\text{Number of pixels/row})$$

Therefore, if a transition between format types occurred at every pixel, the resulting run length encoded format map requires more memory than no encoding. Alternatively, in start/length encoding, the starting point for one pixel format for each window is stored with the length of that window while a second pixel format window is displayed when the first pixel format is not indicated. Finally, in a length/length encoding, the length of all formats are stored. However, in length/length encoding, a format for the beginning of each line must be assumed resulting in decreased flexibility. It should be apparent to one skilled in the art that many types of compression techniques may be used.

Referring to FIG. 3, a multi-format frame buffer 27, a display monitor 31 and a corresponding run length encoded horizontal format map 33 configured in accordance with the present invention are illustrated. In FIG. 3*d*, the horizontal format map 33 depicts a run length encoded horizontal pixel bit map corresponding to the first row of multi-format frame buffer 27 and display monitor 31. Horizontal format map 33 contains two values to identify the format types for the first row of the corresponding multi-format frame buffer 27 and display monitor 31. In this example, horizontal format map 33 employs start/stop encoding with the color map index pixels as the reference for the start/stop encoding. The first "0" value in horizontal format map 33 signifies that the first display monitor location begins with color map index pixels. The second "800" value signifies that the YUV pixel format is selected at location 800 on the first horizontal row.

Figure 4A:
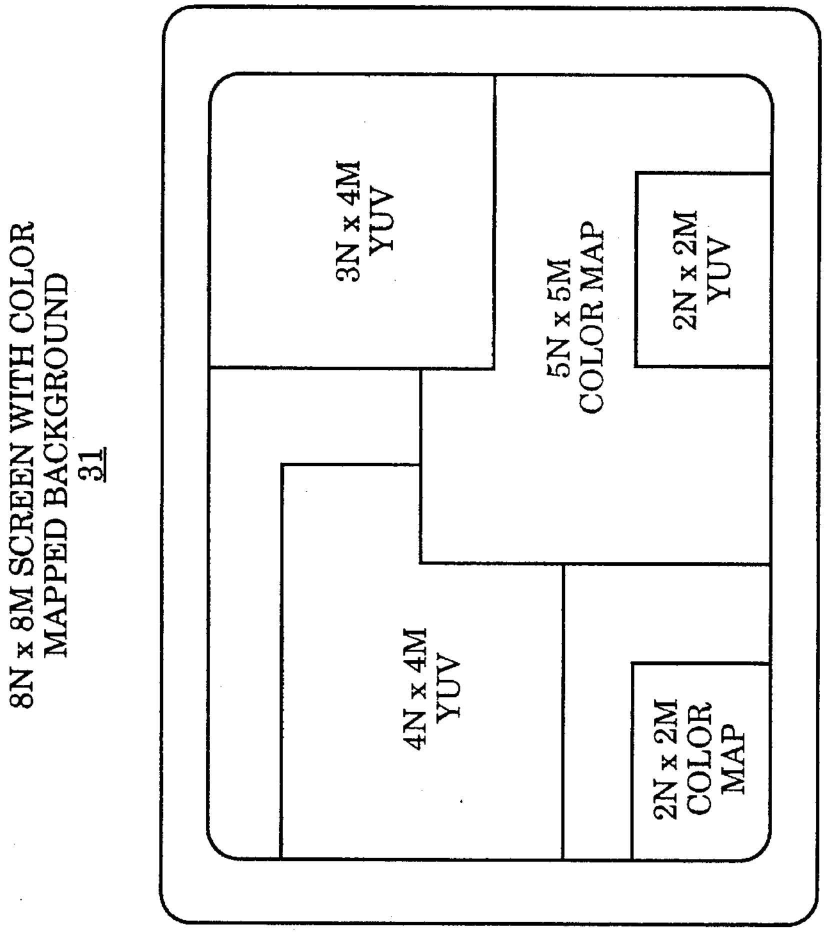
FIG. 4*a* illustrates a multi-format pixel display monitor configured in accordance with the present invention.

As an alternative embodiment to the present invention, a full frame format map is generated for each video field. In FIG. 4*a*, display monitor 31 displays multi-format pixel data comprising YUV and color map index windows with a color mapped index background. The display monitor 31 is effectively apportioned into grids or pixel blocks. Each pixel block contains a single homogenous pixel format type, and a window comprises an integer number of continuous pixel blocks. In the full frame format map embodiment, each window must comprise at least 1pixel block. The present invention may be configured with any size pixel block, however, the size of the pixel block dictates the memory requirements of the system as is described more fully below. In practice, a computer system, operating under the windows environment, would have little need for an application displaying a window smaller than 64×64 pixels on a 1024×768 video display.

Figure 4B:
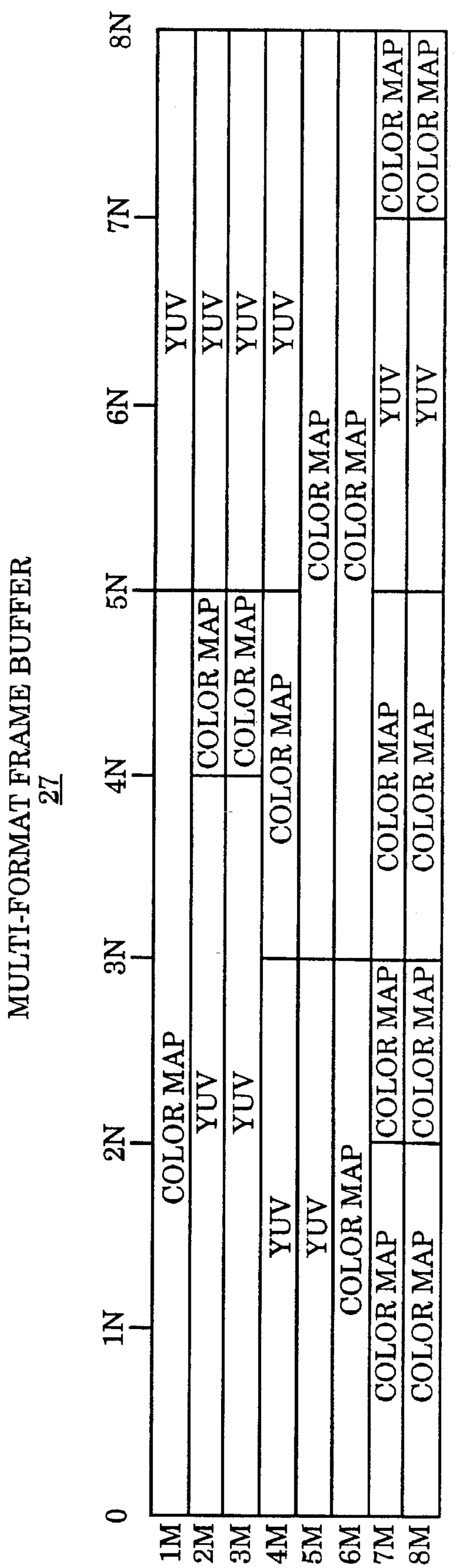
FIG. 4*b* illustrates a multi-format frame buffer configured in accordance/with the display monitor illustrated in FIG. 4*a*.

An example of a display monitor 31 apportioned into pixel blocks in accordance with the present invention is illustrated in FIG. 4*a*. Display monitor 31 of FIG. 4*a* comprises blocks of each N×M pixels with a total display of 8N×8M pixels or 8×8 pixel blocks. Apportioning display monitor 31 into 8×8 pixel blocks results in 64 total pixel blocks. The apportioning of display monitor 31 into 64 pixel blocks is merely exemplary, and any apportionment of display monitor 31 resulting in any number of pixel blocks could be implemented without deviating from the spirit or scope of the invention. More pixel blocks will result in smaller blocks increasing the memory requirement for the format map, but also increasing the flexibility of the window system. In FIG. 4*b*, a multi-format frame buffer 27, containing multi-format pixels for display on display monitor 31, is illustrated. Multi-format frame buffer 27 is shown divided into 8 columns of N pixels and 8 rows of M pixels corresponding to the pixel block division on display monitor 31. Similar to FIG. 3*b*, multi-format frame buffer 27 of FIG. 4*b* is a high level graphical depiction of the pixel formats stored in a multi-format frame buffer configured to support display monitor 31.

Figure 4C:
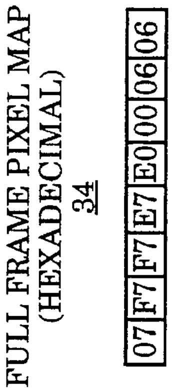
FIG. 4*c* is a full frame format map configured in accordance with the frame buffer illustrated in FIG. 4*b* and the display monitor illustrated in FIG. 4*a*.

Referring to FIG. 4*c*, a full frame format map configured in accordance with the present invention is illustrated. A full frame format map identifies the pixel format for each pixel block on a corresponding multi-format frame buffer and display monitor. Because display monitor 31 displays two different pixel formats, a format identifier comprises 1 bit. The full frame format map begins with a first format identifier defining the pixel format for a pixel block located in the upper left corner. A second format identifier specifies a second pixel block adjacent in a horizontal direction to the first pixel block. In this way, each successive format identifier in the full frame format map identifies the next adjacent pixel block continuing to the right end of the display monitor 31. The full frame format map then continues in a second horizontal row of pixels blocks defining pixel formats for each pixel block extending from the left to right. The complete full frame format map contains one entry for each pixel block of the display.

In FIG. 4*c*, full frame format map 34 corresponds with multi-format frame buffer 27 and video display 31 such that full frame format map 34 defines the pixel format for each pixel block on display monitor 31. For illustration purposes, format identifiers of full frame format map 34 are shown in hexadecimal. As described above, display monitor 31 comprises a maximum of 8 horizontal pixel blocks and 8 vertical pixel blocks. Therefore, eight 1 bit format identifiers are required to specify one horizontal row of pixel blocks. Therefore, full frame format map 34 comprises 64 bits to define each pixel block on display monitor 31. Full frame format map 34 is encoded such that a format identifier containing a 0 indicates a color map index pixel format, and format identifier containing a 1 indicates a YUV pixel format.

The amount of memory required to store the full frame format map is a function of the pixel resolution of the screen, the number of pixel formats displayed, and the pixel block size. Specifically, the memory requirement for the full frame format map is defined by the following equation:

$$\text{Map Size (Bits)}=[(\text{Total\#pixels})/(\text{pixel block size})]*[\text{Format Id size}]$$

where the total number of pixel bits is equal to the vertical pixel resolution times the horizontal pixel resolution, and the pixel block size is the number of pixels in a pixel block. The number of bits required for each format identifier is discussed above, and is dependent upon the number of pixel format types.

A display monitor with a pixel resolution of 1280×1024 has 1,310,720 total pixels. If the display monitor is apportioned into pixel blocks comprising 4×8 pixels, then the pixel block size is 32 pixels. Also, if the graphics display system comprises a color map index and YUV pixel formats, then 1 bit defines each pixel block. As defined by the map size equation, a graphics display system in this example requires 40960 bits or 5.12 kilo (K) bytes of memory to store the full frame format map. The smaller the display monitor resolution and the larger the pixel block size, the less memory is required to store the full frame format map. For example, a display monitor having a 1024×768 resolution, a pixel block size of 8×8, and 2 pixel formats results in a memory requirement of 12,288 bits or 1.536 Kbytes. If a third pixel format is configured on the 1024×768 graphics system having an 8×8 pixel block size, then the full frame format map memory requirement is increased to 24,576 bits or 3.072 Kbytes.

Figure 5:
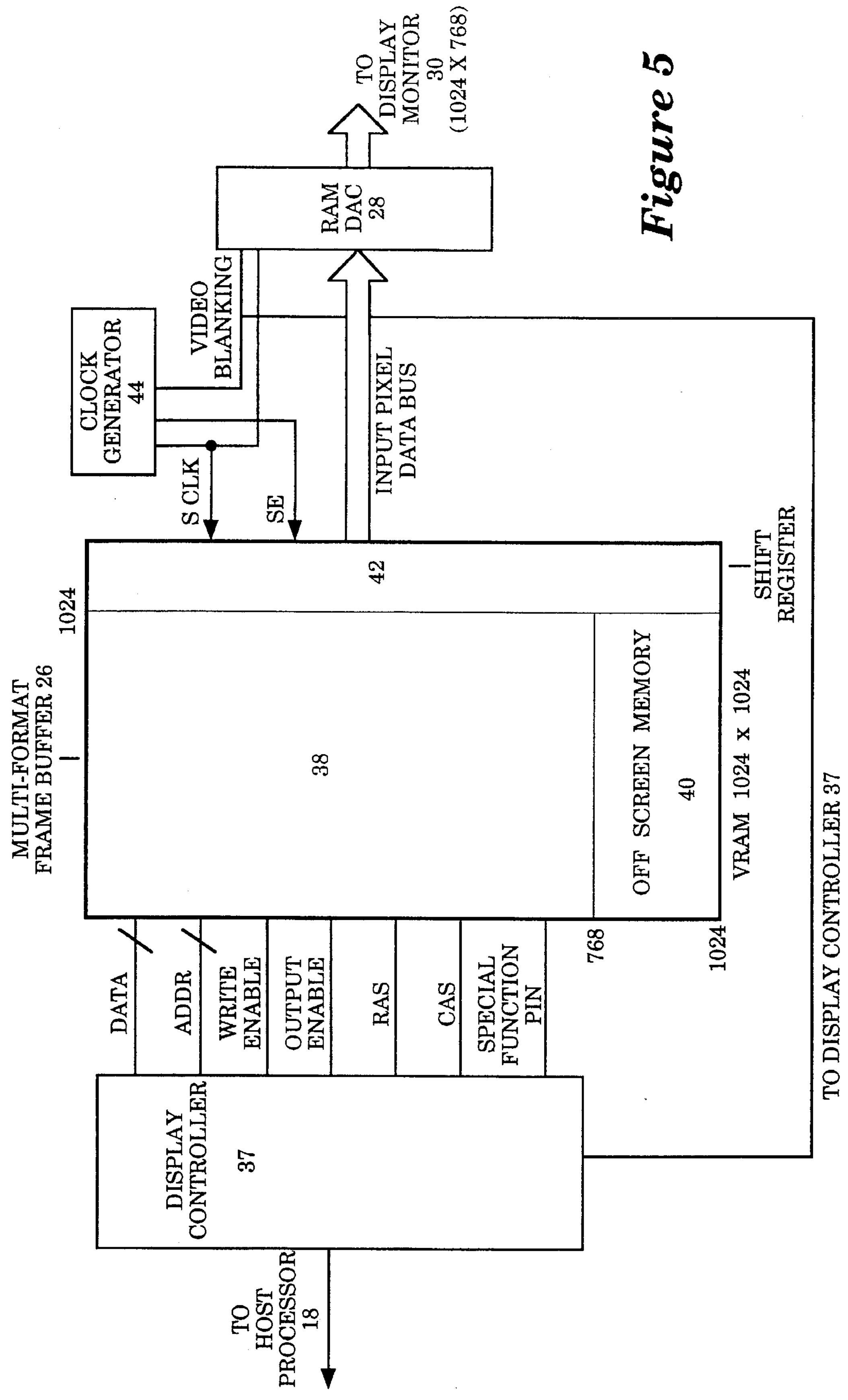
FIG. 5 is a block diagram illustrating a graphics display system configured in accordance with the present invention.

Referring to FIG. 5, a block diagram illustrating a graphics display system configured in accordance with the present invention is illustrated. Host processor system 18 generates multi-format pixels for display on display monitor 31 in accordance with window parameters designated by the windows manager. Upon generation of the multi-format pixels, host processor system 18 transmits pixels to multi-format frame buffer 26. Transmission of pixel data from a graphics processor to a frame buffer, such as transmission of multi-format pixels from host processor system 18 to multi-format frame buffer 26, is well known in the art and will not be described further. In addition to generating and transmitting multi-format pixels, host processor system 18 generates the corresponding horizontal or full frame format map for storage in multi-format frame buffer 26. To accomplish this task, host processor system 18 is pre-configured to generate a horizontal or full frame format map. In a horizontal format map embodiment, host processor system 18 generates a format map for each horizontal line in accordance with the method described above. In a full frame format map embodiment, host processor system 18 generates the full frame format map for an entire video field of pixels. In addition, if employing data compression, host processor system 18 encodes the format map in accordance with the data compression method chosen.

Host processor system 18 is coupled to multi-format frame buffer 26 through an address bus, data bus and a plurality of control pins. Host processor system 18 transfers the format map to multi-format frame buffer 26 through address and data buses and control pins in the same manner multi-format pixel data is transferred. In FIG. 5, multi-format frame buffer 26 comprises a random access memory (RAM) portion 38 with a storage capacity of N×N, (N rows and N columns), pixel elements. Although the present invention is described in conjunction with an N×N multi-format frame buffer, one will appreciate that any frame buffer configuration, including a plurality of video random access memories (VRAM), or a frame buffer implemented with DRAMs, could be implemented without deviating from the spirit and scope of the invention. The display monitor 30 has a pixel resolution of N×M. Therefore, because the number of columns, M, is less then the number of rows, N, the additional memory, (N–M) in multi-format frame buffer 26 is designated as off screen memory 40. Multi-format frame buffer 26 also comprises a shift register 42 for transferring pixel data from RAM portion 38 to RAM DAC 28. The shift register is controlled by a shift clock (SCLK) and a shift register enable (SE) such that when SE is enabled, pixels contained within shift register 42 are output every SCLK cycle. Shift register 42 is intended to represent a broad category of shift registers contained within VRAM devices, including serial output interfaces, or the mechanism whereby pixels are transferred from a DRAM frame buffer to a RAM DAC, all of which are well known in the art and will not be described further.

In the preferred embodiment of the present invention, the format map for the corresponding multi-format pixels is stored in off screen memory 40 of multi-format frame buffer 26. In the horizontal format map embodiment, the RAM portion 38 comprises a horizontal dimension larger than required to support the corresponding display monitor 40. Therefore, for this frame buffer configuration, off-screen memory exists for each horizontal line such that the horizontal format map for each horizontal line is stored horizontally adjacent to each row of multi-format pixels. Furthermore, storing the horizontal format map adjacent to each row of pixels facilitates in the transfer of the horizontal format map to RAM DAC 28. Transfer of multi-format pixels from multi-format frame buffer 26 to RAM DAC 28 is performed in accordance with any standard VRAM to video DAC interface.

In the horizontal format map embodiment, the format map is transferred from multi-format frame buffer 26 to RAM DAC 28 during each horizontal blanking period of display monitor 30. Initiation of the horizontal blanking period is indicated by the edge of a horizontal blanking signal generated in clock generator 44. The horizontal blanking signal provides an interrupt to display controller 37, and upon receipt of the interrupt, display controller 37 initiates a special function transfer in multi-format frame buffer 26 to transfer one row of multi-format pixels from RAM portion 38 to shift register 42. To accomplish this task, display controller 37 enables the special function mode through generation of a control signal on the special function pin. Host processor system 18 provides a row address on the address bus, and activates the RAS pin. Data contained in the row of memory designated by the row address is then transferred from RAM portion 38 to shift register 42. Similarly, in the full frame format map embodiment of the present invention, the full frame format map is transferred from multi-format frame buffer 26 to RAM DAC 28 during a vertical blanking period of display monitor 30. In the full frame embodiment of the present invention, off screen memory 40 is located vertically adjacent to the RAM portion 38 as shown in FIG. 5. Initiation of the vertical blanking period is indicated by the edge of the vertical blanking signal, and an interrupt from the vertical blanking period is generated in display controller 37. Display controller 37 executes the special transfer function in multi-format frame buffer 26 resulting in transfer of the full frame format map to shift register 42, and subsequently to RAM DAC 28.

Figure 6:
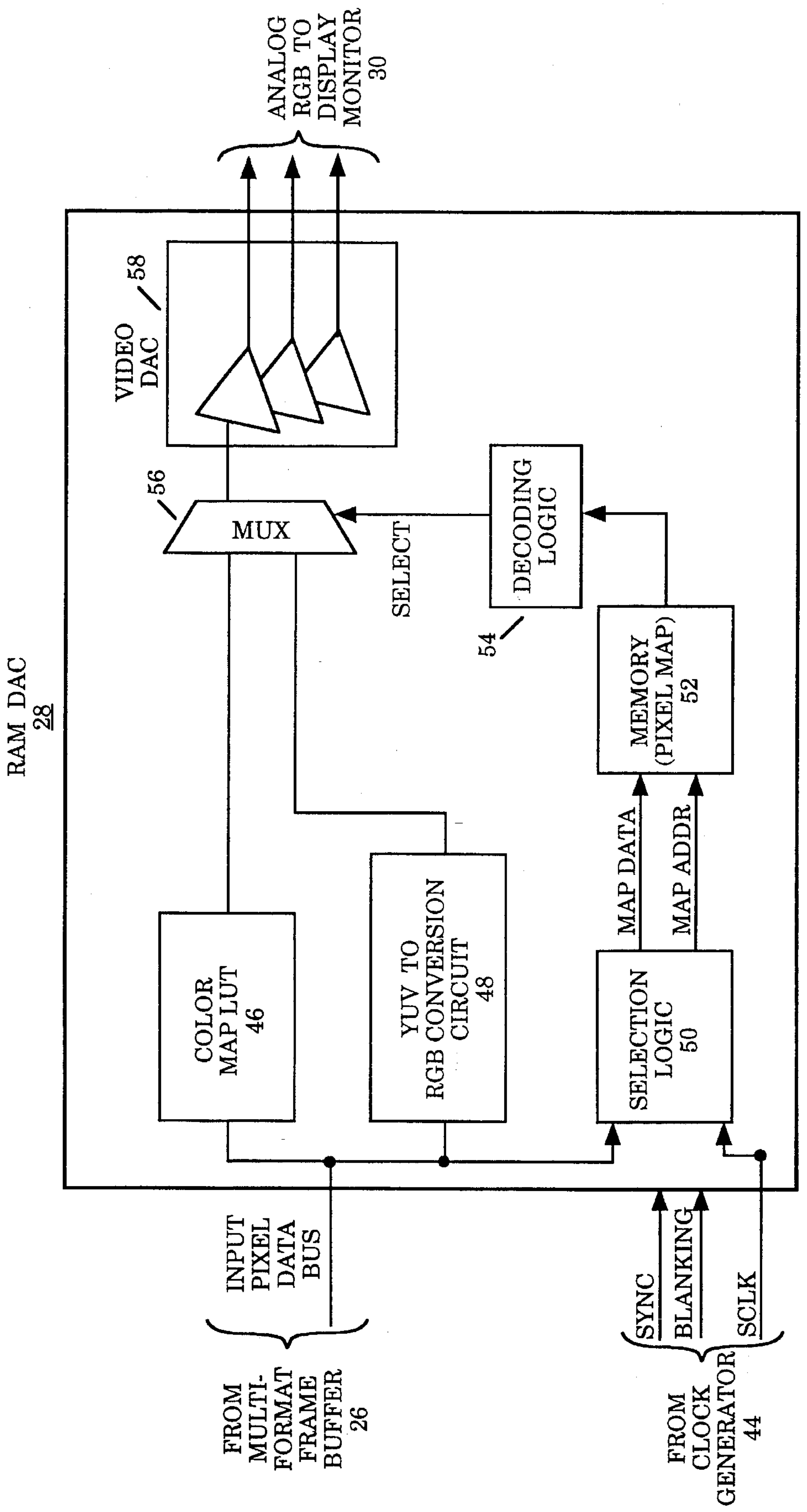
FIG. 6 is a block diagram of a random access memory digital to analog converter (RAM DAC) configured in accordance with the present invention.

Referring to FIG. 6, a block diagram of RAM DAC 28 configured in accordance with the present invention is illustrated. RAM DAC 28 is coupled to multi-format frame buffer 26 by an input pixel data bus. In addition, clock generator 44 provides clocking and control lines to RAM DAC 28. Multi-format pixels from multi-format frame buffer 26 are input to color map look-up table (LUT) 46, YUV to RGB conversion circuit 48 and selection logic 50. The input multi-format pixels are converted in both color map LUT 46 and YUV to RGB conversion circuit 48 to RGB color definition. During a blanking period of display monitor 30, a format map is loaded through selection logic 50 and stored in memory format map 52. During a display period, input multi-format pixels are converted in both color map LUT 46 and YUV to RGB conversion circuit 48, and the color RGB definition outputs are inputs to MUX 56. Also during the display period, the format map, identifying the pixel format for each incoming pixel, is input to decoding logic 54. Decoding logic 54 provides a select to MUX 56 so as to select the RGB color definition generated in either the color map LUT 46 or the YUV to RGB conversion circuit 48. In this way, MUX 56, through use of the format map, selects the RGB color definition corresponding to the pixel format type. The RGB color definition pixels are input to video DAC 58 for conversion to three analog RGB signals. The analog RGB signals are input to display monitor 30 to control three electron beam emitters scanning across the screen of display monitor 30.

For purposes of explanation, two pixel format conversion LUTs are illustrated in FIG. 6. However, one will appreciate that any number of pixel format conversion LUTs could be implemented without deviating from the spirit or scope of the invention. Multi-format pixels, regardless of the format type, are input to both color map LUT 46 and YUV to RGB conversion circuit 48. If the format of multi-format pixels input to RAM DAC 28 is RGB index, then the RGB index pixel is an address to color map LUT 46. The output of color map LUT 46 is a digital value representing the mathematical definition for the actual red, green and blue colors for display. For example, the RGB index pixel data may comprise an 8 bit value for look-up in color map LUT 46. The output of color map LUT 46 is a corresponding 24 bit value representing a pixel having 80% red, 5% blue and 16% green. Alternatively, if the format of pixels input to RAM DAC 28 is YUV, then the YUV to RGB conversion circuit converts the luminance/chrominance digital data to RGB color definition compatible with display monitor 30. In a similar manner, additional conversion means could be provided to convert any digital pixel format type to RGB color definition format compatible with display monitor 30.

Figure 7A:
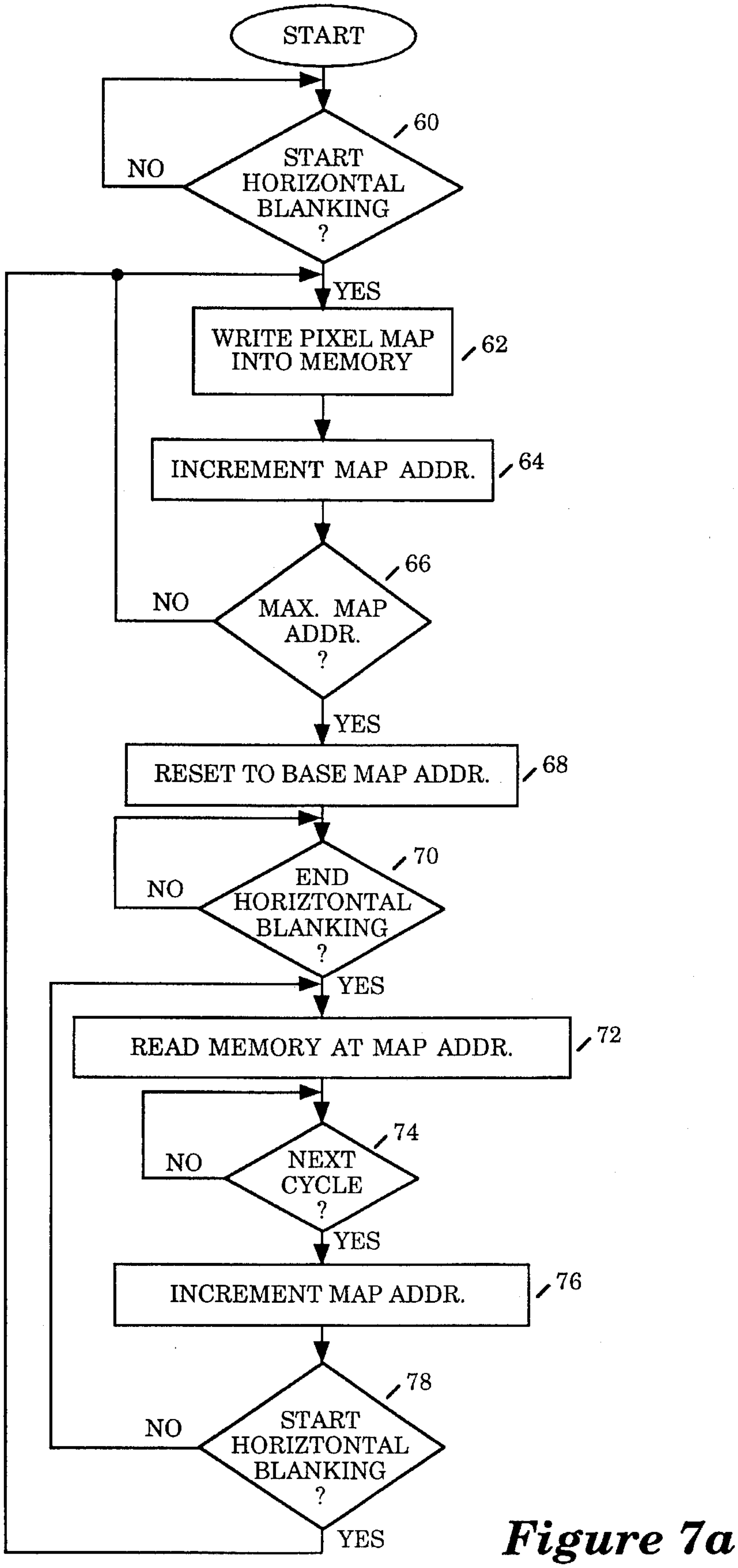
FIG. 7*a* is a flow diagram illustrating a method of implementing a horizontal format map configured in accordance with the present invention.

Referring to FIG. 7*a*, a flow diagram representing the method of operation for selection logic 50 for a computer graphics display system implementing a horizontal format map is illustrated. Upon initiation of a horizontal blanking period, display controller 37 executes a special function to transfer a horizontal format map to RANI DAC 28 as discussed above. Also initiated by the beginning of the horizontal blanking period, selection logic 50 provides format identifiers from the input pixel data bus to the map data lines. In addition, memory 52 is write enabled, and a base map address is provided on the map address lines. Format identifiers, transferred over the input pixel data bus, are written in memory 52. Selection logic 50 then increments the map address so as to prepare for the next SCLK cycle. On each new SCLK cycle, display controller 37 transfers format identifiers of the horizontal format map from multi-format frame buffer 26 to selection logic 50, and subsequently selection logic 50 writes the format identifiers to memory 52. Selection logic 50 also comprises a maximum map address to provide an indicator that the entire horizontal format map has been transferred to memory 52. Depending on the frame buffer organization and specific timing, certain implementations require an additional pin for display controller 37 to identify when the horizontal format map is being transferred. The map address is reset to the base map address in preparation to read the horizontal format map. Loading of the horizontal format map into memory 52 during the horizontal blanking period is illustrated in blocks 60 through 68 in FIG. 7*a*.

After loading the horizontal format map into memory 52, selection logic 50 waits for the display period as designated by the SYNC signal. Upon initiation of the display period, selection logic 50 reads memory 52 by enabling the read mode and placing the base map address on the map address lines. In the preferred embodiment without data compression of the format map, memory 52 is a dual port Y×(number of bits in format ID) random access memory (RAM) where Y is any value sufficient to provide enough memory to store each horizontal format map. In the preferred embodiment, there is no need for decoding logic 54. The second port of memory 52 is directly coupled to the select input of MUX 56. The select line is provided to MUX 56 during the period of the SCLK where the converted pixel is valid. Based on the format identifier value, the proper pixel format is selected. Similarly, upon each SCLK cycle during the display period, selection logic 50 reads out a new format identifier front the horizontal format map contained in memory 52. The new format identifier is then provided, within the same SCLK cycle, to MUX 56 thereby selecting the desired output pixel. The horizontal format map is sequentially read out of memory 52 until the initiation of a new horizontal blanking period. The reading of the horizontal format map out of memory 52 is illustrated in blocks 70 through 78 in FIG. 7*a*.

In a preferred embodiment employing run length encoding, the second port of memory 52 is coupled to decoding logic 54. In this embodiment the selection logic needs to interact with the decoding logic to know when to access the next memory entry. Decoding logic 54 and associated selection logic 50 are intended to represent a broad category of run length decoders which are well known in the art and will not be described further.

Figure 7B:
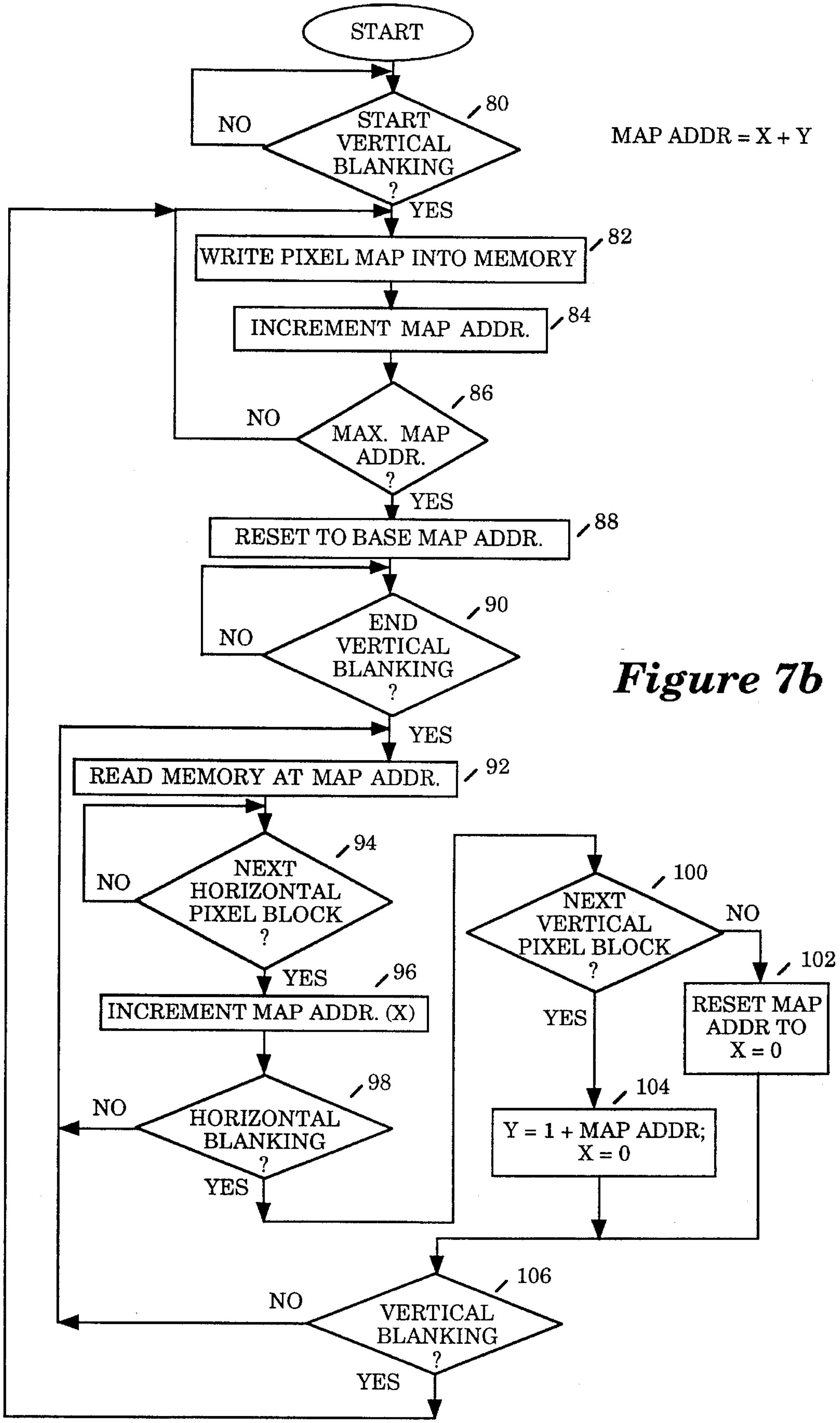
FIG. 7*b* is a flow diagram illustrating a method of implementing a full frame format map configured in accordance with the present invention.

Referring to FIG. 7*b*, a flow diagram representing the method of operation for selection logic 50 for a computer graphics system implementing a full frame format map is illustrated. Upon initiation of a vertical blanking period, display controller 37 executes a special function to transfer the full frame format map to RAM DAC 28 as discussed above. Also initiated by the beginning of the vertical blanking period, selection logic 50 provides data from the input pixel data bus to the map data lines. In addition, memory 52 is write enabled, and a base map address is provided on the map address lines. After successfully writing a first format identifier of the full frame format map to memory 52, selection logic 50 increments the map address so as to prepare for the next SCLK cycle. On each new SCLK cycle, display controller 37 transfers a format identifier of the full frame format map from multi-format frame buffer 26 to selection logic 50, and subsequently selection logic 50 writes the format identifier to memory 52. Selection logic 50 also comprises a maximum full frame format map address to provide an indicator that the entire vertical pixel has been transferred to memory 52. The map address is then reset to the base map address in preparation to read then next full frame format map. Loading of the full frame format map into memory 52 during the vertical blanking period is illustrated in blocks 80 through 88 in FIG. 7*b*.

After loading the full frame format map into memory 52, selection logic 50 waits for the display period as designated by the SYNC signal. Upon initiation of the display period, selection logic 50 reads memory 52 by enabling the read mode and placing the base map address on the map address lines. The map address equals (X+Y), where X represents a horizontal pixel block count and Y represents a vertical pixel block count times X. The first full frame format map format identifier corresponding to the base map address continues to drive the select line on MUX 56 for every SCLK cycle in the horizontal pixel block. For example, for an 8×8 pixel block, a format identifier drives the select line of MUX 56 for 8 SCLK cycles. On the next horizontal pixel block, the X variable of the map address is incremented providing a second format identifier to drive the select line of MUX 56. This cycle is continued as the electron guns of the display monitor sweep horizontally across a screen on the display monitor.

When the electron guns reach the end of the a horizontal row in the display monitor, the event is signified by the beginning of the horizontal blanking period. During the horizontal blanking period, or retrace period, selection logic 50 determines whether the next video line starts a new vertical pixel block. If the next line signifies the beginning of a new vertical pixel block, then the Y variable is set to 1+ map address, and the X variable is reset to 0. Alternatively, if the next horizontal line remains in the first vertical pixel block, then only the X variable is reset to 0. In the 8×8 pixel block example, if the electron guns sweep across eight horizontal lines, and the ninth horizontal line begins a second (vertical pixel block), then the format identifier corresponding to this pixel block is located at a map address one greater then the pixel block of the previous row and last column. As in the first horizontal pixel block row, selection logic 50 increments the map address when the electron guns advance to a new pixel block column. The procedure of incrementing and resetting the X variable of the map address for every new horizontal pixel block, and setting the Y variable of the map address for every new vertical pixel block is continued until the next vertical blanking period. Reading of the full frame format n-tap from memory 52 is illustrated in blocks 90 through 106 in FIG. 7*b*.

Figure 8:
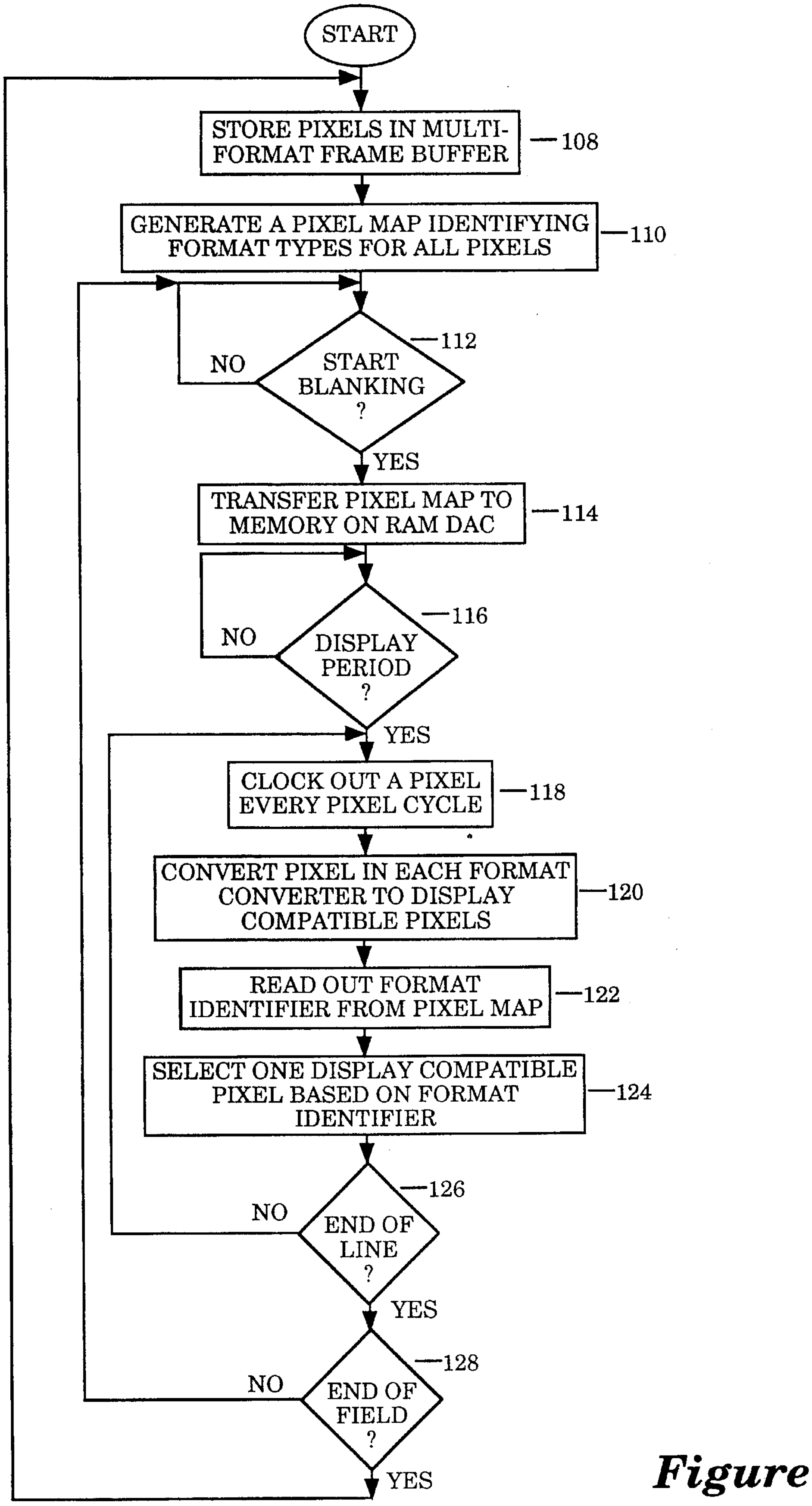
FIG. 8 is a flow diagram illustrating the method of the present invention.

Referring to FIG. 8, a flow diagram illustrating the method of the present invention is shown. The host processor system 18 generates pixels for display on a monitor, and the pixels are stored in a multi-format frame buffer. The host processor then generates a format map, for the corresponding pixels stored in the multi-format frame buffer, which identifies format types for each pixel. Upon the initiation of a horizontal or vertical blanking period, depending on whether horizontal or full frame format maps are used, the format map to be displayed on the monitor is transferred to the memory of the RAM DAC by the display controller 37. Upon the beginning of the next display period, a row of pixels, one pixel every pixel cycle, is transferred from the multi-format frame buffer to the RAM DAC as illustrated in block 118. Each pixel is converted to a display compatible pixel in each format converter as shown in block 120. In blocks 122 and 124, a format identifier is also read out every pixel cycle, and the appropriate pixel from the format converters is selected by the value of the format identifier. This process is continued for each pixel in the corresponding line. For the next horizontal or vertical blanking period, a new format map is loaded and, during each pixel cycle, an output format compatible pixel is selected based on the value of a new format identifier.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for displaying a plurality of pixels on a display monitor, said apparatus comprising:

multi-format pixel storage means for storing said plurality of pixels, each pixel comprising one of a plurality of pixel format types;

first pixel map storage means for storing a format pixel map comprising a plurality of format identifiers, wherein said format identifiers specify a pixel format type for a corresponding pixel;

conversion means coupled to said multi-format pixel storage means for converting a pixel to a display compatible pixel for each format type to generate a plurality of display compatible pixels;

second pixel map storage means coupled to said first pixel map storage means for said format pixel map for rendering pixels for display on said display monitor; and transferring means coupled to said first pixel map storage means and second pixel map storage means for transferring said format pixel map from said first pixel map storage means to said second pixel map storage means during a pre-determined interval, and for transferring a format identifier from said format pixel map to said second pixel map storage means for selection of said display compatible pixel; and selection means coupled to said conversion means and said second pixel map storage means for selecting a display compatible pixel from said plurality of display compatible pixels based on a corresponding format identifier from said format pixel map such that said display compatible pixel selected is compatible for display on said display monitor.

2. The apparatus as set forth in claim 1, wherein the pre-determined interval is a video blanking interval.

3. The apparatus as set forth in claim 2, wherein said pre-determined interval comprises a horizontal blanking period for said display monitor.

4. The apparatus of claim 2 wherein said video blanking interval is a vertical blanking interval, said first pixel map storage means stores successively said format pixel map, and said transferring means transfers said plurality of format identifiers from said first pixel map storage means to said second pixel map storage means during said vertical blanking interval.

5. The apparatus as set forth in claim 1, wherein said pixel map storage means further comprises means for converting said format identifiers to a run length encoding format.

6. The apparatus as set forth in claim 1, further comprising pixel map generation means for:

selecting a block size designating window areas of said display monitor such that said pixels displayed in said window area comprise a single pixel format type; and assigning format identifiers in said format map such that each format identifier specifies one of said plurality of format pixel types for a corresponding window area.

7. The apparatus as set forth in claim 1, wherein said first pixel map storage means comprises off-screen memory.

8. The apparatus as set forth in claim 1, wherein said conversion mean comprises:

RGB conversion means for converting said pixel from an RGB pixel index to an RGB definition; and YUV conversion means for converting said pixel from an YUV pixel to an RGB definition.

9. An apparatus for displaying a plurality of pixels on a display monitor, said apparatus comprising:

a multi-format frame buffer comprising:

a first memory portion that stores said plurality of pixels, each pixel comprising one of a plurality of pixel format types;

a second memory portion that stores a format pixel map comprising a plurality of format identifiers, wherein said format identifiers specify a pixel format type for a corresponding pixel;

format converters coupled to said multi-format frame buffer to receive pixels that convert a pixel to a display compatible pixel for each format type to generate a plurality of display compatible pixels;

a pixel map memory coupled to receive said plurality of format identifiers from said second memory portion of said multi-format frame buffer; and a multiplexing circuit coupled to select from said format converters a display compatible pixel from said plurality of display compatible pixels based on a corresponding format identifier from said pixel map memory.

10. The apparatus as set forth in claim 9, wherein said pixel map memory is coupled to receive a video blanking signal and said multi-format frame buffer provides said plurality of format identifiers to said pixel map memory responsive to said video blanking signal.

11. The apparatus as set forth in claim 10, wherein said predetermined interval comprises a horizontal blanking period for said display monitor.

12. The apparatus as set forth in claim 10, wherein said second memory portion comprises off-screen memory in said multi-format frame buffer.

13. The apparatus of claim 10 wherein said video blanking signal is a vertical blanking signal.

14. The apparatus as set forth in claim 9, further comprising a processor that converts said format identifiers to a run length encoding format.

15. The apparatus as set forth in claim 9, further comprising a processor that selects a block size to designate window areas of said display monitor such that said pixels displayed in said window area comprise a single pixel format type, and that assigns format identifiers in said format map such that each format identifier specifies one of said plurality of format pixel types for a corresponding window area.

16. The apparatus as set forth in claim 9, wherein said format converters comprise:

a RGB look-up table that converts said pixel from an RGB pixel index to an RGB definition; and a YUV converter that converts said pixel from an YUV pixel to an RGB definition.

17. A method for displaying a plurality of pixels on a display monitor, said method comprising the steps of:

storing said plurality of pixels in a multi-format frame buffer, each pixel comprising one of a plurality of pixel format types;

storing a format pixel map in a first memory element, the format pixel map comprising a plurality of format identifiers, wherein said format identifiers specify a pixel format type for a corresponding pixel;

transferring at least one format identifier from said format pixel map to a second memory element during a pre-determined interval;

converting, for each pixel format type, a pixel to generate a plurality of display compatible pixels; and selecting a display compatible pixel from said plurality of display compatible pixels based on a corresponding format identifier stored in said second memory element such that said display compatible pixel selected is compatible for display on said display monitor.

18. The method as set forth in claim 17, wherein said pre-determined interval comprises a vertical blanking period for said display monitor and said step of transferring at least one format identifier comprises the step of:

transferring said plurality of format identifiers comprising said format pixel map from said first memory element to said second memory element.

19. The method as set forth in claim 18, wherein said predetermined interval comprises a horizontal blanking period for said display monitor.

20. The method as set forth in claim 17, wherein the step of storing a format pixel map further comprises the step of storing said format identifiers in a run length encoding format.

21. The method as set forth in claim 17, further comprising the steps of:

selecting a block size designating window areas of said display monitor such that said pixels displayed in said window area comprise a single pixel format type; and assigning format identifiers in said format map such that each format identifier specifies one of said plurality, of format pixel types for a corresponding window area.

22. The method as set forth in claim 17, wherein the step of storing said format pixel map comprises the step of storing said format pixel map in off-screen memory of said multi-format frame buffer.

23. The method as set forth in claim 17, wherein the step of converting a pixel to a plurality of display compatible pixels comprises the steps of:

converting said pixel from an RGB pixel index to an RGB definition; and converting said pixel from an YUV pixel to an RGB definition.

24. A computer system comprising:

a display monitor;

a processor for generating a format map comprising a plurality of format identifiers, and for generating pixels for said display monitor, wherein each pixel comprises one of a plurality of pixel format types, and said format identifiers specify a pixel format type for a corresponding pixel;

a multi-format frame buffer comprising:

a first memory portion coupled to said processor that stores a plurality of pixels;

a second memory portion coupled to said processor that stores a format pixel map;

format converters coupled to said multi-format frame buffer to receive pixels, said format converters each convert a pixel to a display compatible pixel for each format type to generate a plurality of display compatible pixels;

a pixel map memory coupled to receive said plurality of format identifiers from said second portion of said multi-format frame buffer; and a multiplexer, coupled to said format converters and to said pixel map memory, that selects a display compatible pixel from said plurality of display compatible pixels based on a corresponding format identifier from said format pixel map such that said display compatible pixel selected is compatible for display on said display monitor.

25. The computer system of claim 24 wherein said second memory portion stores successively said pixel map, and wherein said pixel map memory receives said pixel map during a vertical blanking interval.

26. A computer display apparatus comprising:

a frame buffer comprising:

a RAM portion storing a frame comprising a plurality of pixels;

an off screen memory portion storing a frame format map comprising a plurality of format identifiers successively stored and respectively identifying said plurality of pixels of said frame;

conversion circuitry coupled to receive data representing a first pixel having a first respective format identifier from said frame buffer, said conversion circuitry also being coupled to receive a video blanking signal, said conversion circuitry comprising:

a pixel map memory coupled to receive said frame format map responsive to said video blanking signal;

a first format converter coupled to receive said data from said frame buffer;

a second format converter coupled to receive said data from said frame buffer;

a digital to analog converter having an input selected from either said first format converter or said second format converter depending on said first respective format identifier.

27. The computer display apparatus of claim 26 wherein said frame format map is a full frame format map wherein said plurality of format identifiers respectfully identify every pixel of said frame, and wherein said video blanking signal is a vertical blanking signal.

28. The computer display apparatus of claim 26 wherein said frame further comprises a plurality of pixel blocks, each of said plurality of pixel blocks comprising a subset of said plurality of pixels, and wherein each of said plurality of format identifiers respectively identifies one of said plurality of pixel blocks.

29. The computer display apparatus of claim 26 further comprising:

a processor that converts said plurality of format identifiers to a run length encoding format;

selection means having a select input and coupling said first format converter and said second format converter to said digital to analog converter;

decoding circuitry coupled to said pixel map memory and coupled to said select input of said selection means, said decoding circuitry decoding said run length encoding format.

30. The apparatus of claim 26 wherein video blanking signal is a vertical blanking signal.

* * * * *